No. 793,504. PATENTED JUNE 27, 1905.
A. CASTELIN.
ANCHORING DEVICE FOR TRACTORS.
APPLICATION FILED OCT. 19, 1903.

2 SHEETS—SHEET 1.

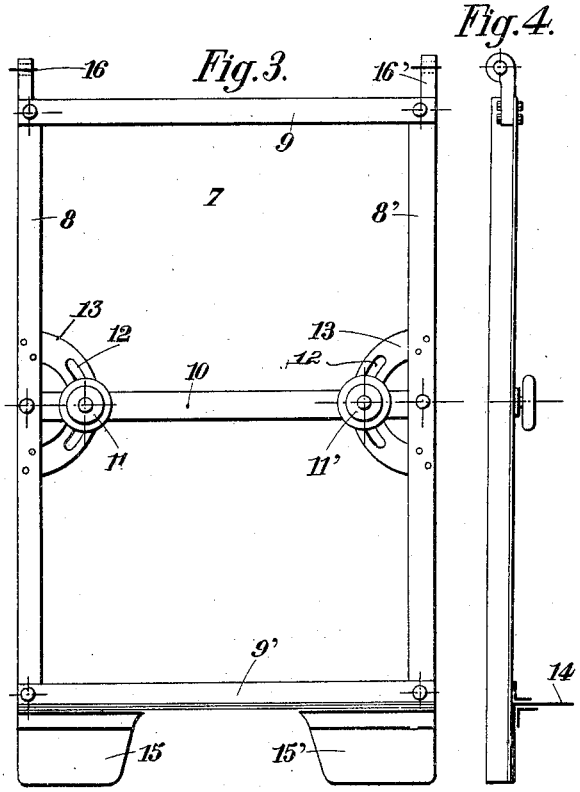

No. 793,504. Patented June 27, 1905.

UNITED STATES PATENT OFFICE.

ANDRÉ CASTELIN, OF PARIS, FRANCE, ASSIGNOR TO THE SOCIÉTÉ ANONYME D'ÉTUDES ET D'EXPLOITATION DES BREVETS A. CASTELIN POUR MACHINES AGRICOLES AUTOMOBILES, OF PUTEAUX, FRANCE.

ANCHORING DEVICE FOR TRACTORS.

SPECIFICATION forming part of Letters Patent No. 793,504, dated June 27, 1905.

Application filed October 19, 1903. Serial No. 177,625.

*To all whom it may concern:*

Be it known that I, ANDRÉ CASTELIN, engineer, a citizen of the French Republic, residing at Paris, France, have invented certain new and useful Improvements in Anchoring Devices for Tractors, of which the following is a specification.

This invention relates to new and useful improvements in anchoring devices for tractors.

The anchoring device is intended principally for use with tractors used in operating agricultural implements; but it may be used in connection with any type of tractor.

The invention has for its object to construct a device adapted to be secured to a suitable part of a tractor and penetrate the ground to prevent overturning or displacement of the tractor by reason of the pull upon the cable connected to the implement to be operated.

A further object of the invention is to construct an anchoring device of the character described which when attached to one end of a tractor and the cable connecting the tractor to the implement to be operated extends at an angle to the longitudinal axis of the tractor or when attached to the side of a tractor and the cable extends at an angle greater or smaller than a right angle with respect to the side of the tractor-bed may be readily adjusted to compensate for the angular pull of the cable with respect to the tractor and prevent the tractor from being displaced or overturned.

Other objects of the invention will hereinafter appear.

To these ends my invention consists of the novel construction, combination, and arrangement of parts hereinafter described, and illustrated in the accompanying drawings, wherein I have set forth the preferred embodiment of my invention; but it is to be understood that I do not limit myself to the details of construction therein set forth, but may make such changes, variations, and modifications therein as properly come within the scope of the claims hereunto appended.

In describing my invention in detail reference is had to the accompanying drawings, wherein—

Figure 1:
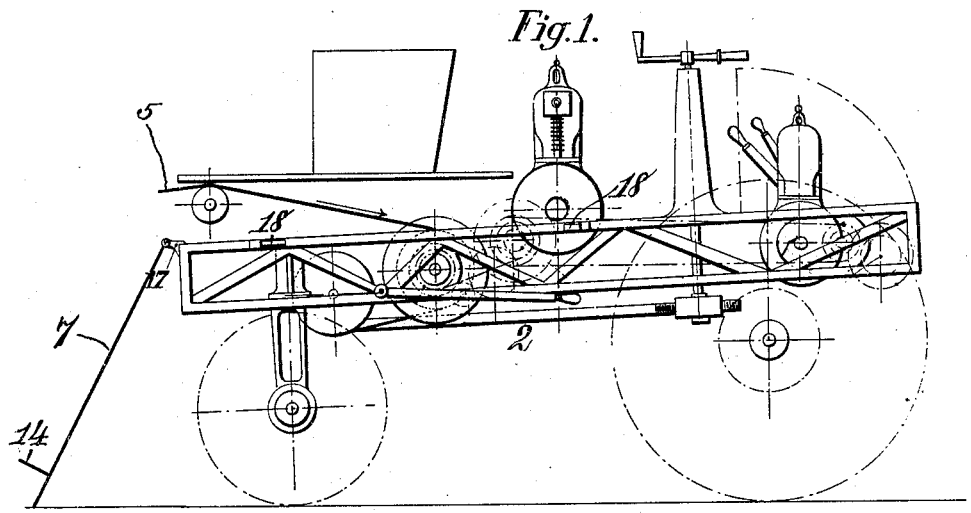
Figure 2:
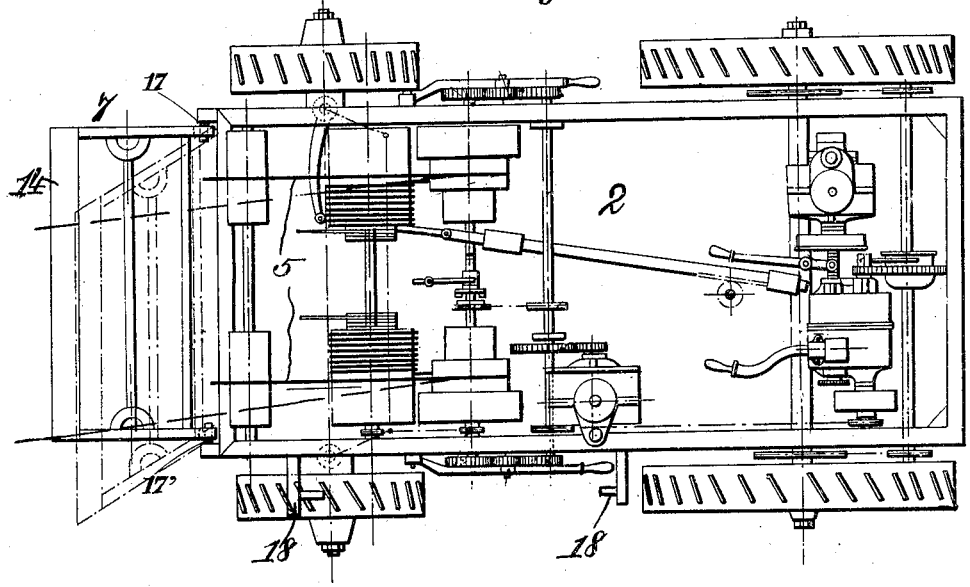

Figure 1 is a side elevation of a tractor having my anchoring device secured to one end thereof, the anchoring device being shown in operative position. Fig. 2 is a top plan view of a tractor having an anchoring device secured to one end thereof, the dotted lines showing the anchoring-frame adjusted to a position to prevent the tractor from being overturned when the implement to be operated is not directly in front of the tractor, but is to one side of the longitudinal axis of the tractor, and the cable connecting the implement to the tractor therefore extends obliquely to said axis. Fig. 3 is a view in elevation of the preferred embodiment of my anchoring device; and Fig. 4 is a view of the anchoring device, taken at right angles to Fig. 3.

Referring to Figs. 3 and 4 of the drawings, the anchoring device (denoted by the reference character 7) comprises side members 8 and 8' and upper and lower transverse members 9 and 9'. The ends of the members 9 and 9' are shown as lapping over the side members 8 and 8' and as pivotally connected thereto. The lower ends of the side members 8 and 8' preferably extend slightly beyond the points of connection of the lower end member 9'. Suitably secured to the lower end member 9' and extending over the projecting ends of the side members 8 and 8' are blades or spades 15 15', adapted to penetrate the ground. The projecting ends of the side members 8 and 8' thus serve to strengthen the blades or spades 15 15' and prevent the latter from being bent or twisted from the end member 9'. Suitably secured to the upper face of the end member 9' is an upwardly-projecting rib or plate 14, which preferably extends the entire length of said end member 9'. This rib or plate 14 is adapted when the anchoring device is in its operative position to rest upon the ground and limit the penetration of the blades or spades 15 15'. The upper end of the frame is arranged for connection with a tractor in such a manner that the side members 8 and 8' may be moved to the right or left to any angle with respect to the tractor. In the drawings the upper ends of the side members 8 and 8' are shown as provided with brackets, each of which has an eye or opening. The eye or opening in the bracket attached to the side member 8 is denoted by the reference character 16 and that in the bracket attached to the side member 8' is denoted by the reference character 16'. The eyes 16 and 16' are adapted to receive lugs or other suitable devices 17 17', suitably mounted on the tractor. The diameter of the lugs or other devices 17 17' is somewhat smaller than that of the eyes 16 16' to permit the side members 8 8' to swing to the right or to the left on said lugs. The tractor itself forms no part of the present invention, and therefore will not be described in detail. It will thus be evident that since the side members 8 and 8' and the end members 9 and 9' of the frame 7 are pivotally connected together and the side members 8 8' are free to swing to the right or to left on the lugs 17 17', as above described, unless some device is provided to secure them in an adjusted relation the lower end member 9' can be freely moved to the right or to the left with respect to the upper end member 9. My preferred means for setting the side and end members in an adjusted relation comprises a transverse bar 10 of approximately the same length as the end members 9 and 9', which is pivotally connected at each of its ends by means of a loosely-fitting bolt, rivet, or other suitable device to one of the side members at a point approximately centrally of the length thereof. Secured to the side members 8 and 8' are semicircular sectors 13, having semicircular slots 12, through which extend clamp-screws or other holdfast devices which engage the bar 10 near its ends. Hand-wheels 11 11', suitably secured to the clamp-screws, serve to tighten and loosen the latter. Thus when the clamp-screws are released they will be free to move in the slots 12, and the side members 8 and 8' can be moved obliquely with respect to the upper end member 9 and the bed of the tractor, and the lower end member 9' may correspondingly be moved to the right or to the left. By tightening the clamp-screws the side members 8 and 8' will be clamped to the transverse bar 10 to set the side members 8 and 8' at any angle with respect to the upper end member 9, the lower end member 9' and blades 15 15' always being parallel to the upper end member 9 and to the tractor-bed.

The cables 5 have their free ends attached to an agricultural implement—for example, a plow, (not shown)—and have their other ends attached to suitable winding devices mounted on the bed of the tractor. Therefore when the plow or other agricultural implement to be operated is situated directly in front of the tractor 2—that is to say, in a line with the longitudinal axis of the tractor—and the cables 5 extend in substantially the same direction as the longitudinal axis of the tractor-bed the anchoring device is set so that the side members 8 and 8' are at right angles to the end members 9 and 9', as shown in the full lines, Fig. 2. It will be evident, however, that when the implement to be operated is situated any appreciable distance to the right or to the left of the axis of the tractor the cables 5 will extend at an angle to the axis of the tractor, as shown in dotted lines, Fig. 2, and the pull exerted by the cables will have a tendency to turn the tractor on one of the blades or spades 15 15' as a fulcrum and displace or overturn the tractor. To prevent this from occurring, the clamp-screws are released, and the lower end member 9' of the anchoring device is moved to the right or to the left, according to whether the implement to be operated is situated to the right or to the left of the axis of the tractor. The side members 8 and 8' will therefore extend at an angle to the upper end member 9 and to the bed of the tractor. The clamp-screws are then tightened to secure the frame in such adjustment as shown in dotted lines, Fig. 2. When, therefore, the tractor is set in operation and the agricultural implement is drawn toward the tractor in a direction obliquely to the axis of the same, the frame 7, having the blades or spades carried by its lower end member penetrating the ground and its side members 8 and 8' extending obiquely to the upper and lower end members 9 and 9', will overcome the angular pull on the cables 5 with respect to the tractor 2 and effectually prevent displacement and overturning of the latter. When the implement to be operated is at one side of the tractor and the cables extend transversely of the bed of latter, the anchoring-frame may, as before stated, be attached to one side of the tractor-bed by means of suitable attaching devices 18, secured to the side of the tractor. In such case the anchoring device operates in substantially the same manner as when attached to the end of the tractor.

Having now described my invention, what I claim, and desire to secure by Letters Patent, is—

1. An anchoring device for a tractor, embodying a frame arranged for connection with a tractor, said frame having one of its ends provided with means adapted to penetrate the ground to prevent displacement and overturning of the tractor.

2. An anchoring device for tractors, comprising a frame having ground-penetrating means, said frame arranged for flexible connection with a tractor to permit of lateral adjustment of said ground-penetrating means with respect to the tractor.

3. An anchoring device for a tractor, embodying a frame arranged for connection with a tractor, said frame comprising side and transverse members suitably connected together, said frame provided at its lower end with ground-penetrating means.

4. An anchoring device for tractors, embodying a frame comprising side members arranged for connection with a tractor to secure the angular adjustment of said side members with respect to the tractor, and an additional member flexibly united to said side members, said additional member having ground-penetrating means.

5. An anchoring device for tractors, embodying a frame arranged for connection with a tractor, said frame comprising side and transverse members suitably connected together, one of said transverse members having ground-penetrating means and further provided with means extending at an angle to said ground-penetrating means to limit the penetration of the latter.

6. An anchoring device for tractors, comprising a frame having ground-penetrating means, and further provided with means to limit the penetration of the ground-penetrating means, said frame arranged for flexible connection with a tractor to permit of lateral adjustment of said ground-penetrating means with respect to the tractor.

7. An anchoring device for a tractor, embodying a frame arranged for connection with a tractor, said frame comprising side and transverse members suitably connected together, one of said transverse members having ground-penetrating means, and means extending transversely of the frame and arranged at an angle to the ground-penetrating means to limit the penetration of the latter.

8. An anchoring device for a tractor, embodying a frame comprising side and transverse members flexibly connected together, said side members arranged for flexible connection with a tractor to permit of their angular adjustment with respect to the transverse members, said frame having ground-penetrating means at its lower end, and bracing means to secure said side and transverse members in an adjusted relation.

9. An anchoring device for tractors, embodying a frame comprising side members arranged for connection with a tractor to permit of their angular adjustment with respect to the tractor, a transverse member flexibly connected to the lower portions of said side members, said transverse member having ground-penetrating means, a transverse bracing member flexibly connected to said side members, and clamping means associated with said bracing member and with the side members to secure said side members in their adjusted position.

10. An anchoring device for a tractor, embodying a frame comprising side and transverse members, said side members arranged for flexible connection with the tractor to permit of their angular adjustment with respect to said transverse members, said frame provided at its lower end with ground-penetrating means, a bracing member extending transversely of the frame and flexibly connected to said side members, plates secured to the side members, and clamping means engaging said plates and the bracing member for fixedly maintaining said side and transverse members in an adjusted relation.

11. An anchoring device for a tractor, embodying a frame comprising side and transverse members, said side members arranged for flexible connection with the tractor to permit of their angular adjustment with respect to said transverse members, said frame provided at its lower end with ground-penetrating means, a bracing member extending transversely of the frame and flexibly connected to said side members, segmentally-slotted plates secured to the side members, and holdfast devices extending through the slots in said plates and engaging said bracing member for fixedly maintaining said side and transverse members in an adjusted relation.

In testimony whereof I have hereunto set my hand in presence of two subscribing witnesses.

ANDRÉ CASTELIN.

Witnesses:
AUGUSTUS E. INGRAM,
J. L. LEISON.